United States Patent Office 3,535,611
Patented Oct. 20, 1970

3,535,611
ELECTRICAL ENERGY CONVERTER
Jacques Toulemonde, Versailles, France, assignor to Compagnie Generale d'Electricite, Paris, France
Continuation-in-part of application Ser. No. 626,792, Mar. 29, 1967. This application May 20, 1969, Ser. No. 830,574
Int. Cl. H02m 7/00
U.S. Cl. 321—6
14 Claims

ABSTRACT OF THE DISCLOSURE

Converting device for electrical energy, capable of operating as a rectifier as well as a converter with the power factor cos practically equal to 1, wherein a symmetrical rectifying device is connected on terminals of a transformer winding, with two identical inductors and two controlled rectifiers in series, and a branch connected to the middle point of said winding including an inductor essentially smaller than said inductors, shunted by a third controlled rectifier; a filter device connected to a direct current load; and a program device which fires said controlled rectifiers depending on the instantaneous values of the electrical parameters as well as of a program value.

BACKGROUND OF THE INVENTION

This is a continuation-in-part of application Ser. No. 626,792, filed Mar. 29, 1967, and now abandoned.

The present invention relates to a device for transforming electrical energy from alternating current into direct current or from direct current into alternating current, which is designed to perform these transformations with satisfactory efficiency and specifically with a power factor substantially equal to unity.

Rectifying devices are known, for transforming alternating current into direct current, as are converters and other devices for transforming direct current into alternating current, and, these devices are acquiring increasing importance in the transmission of high powers over considerable distances. It is known in fact, that in order to resolve this problem in the most appropriate manner under prescribed conditions, the present tendency increasingly favors the application of high direct voltages to the line, which imposes the need for insertion of a rectifier between the A.C. generation system (three-phase as a rule) and the direct current line, and of a converter between the direct current line and the alternating current destination system, which is equally of a three-phase nature.

A conversion of this kind, speaking of rectifying in particular, is performed as a rule by means of rectifying elements such as those of the mercury vapor or solid state type, which include a control electrode, and in particular silicon rectifiers including a control electrode. These elements are normally connected in bridge circuits, several forms of these being well known in the art, in association with one or more inductances insuring continuous conduction.

It is well known that in these systems, control of the rectified power is then accomplished by adjustment of the response phase of the different bridge elements. In order to deliver maximum power, the maximum angle of opening will be adopted which is compatible with the bridge circuit employed, this angle amounting to 180° in the case of a single phase bridge and to 120° in the case of a three-phase bridge for example. A smaller angle will be adopted when it is desired to deliver a lower power.

For the generator, this results in a delivery of current out of phase with the voltage, the power factor of the supply grid thus being appreciably smaller than unity. It is known that since such an operating condition for a generator system is hardly economical, efforts are normally made to keep the power factors of the system as close to unity as possible by balancing the consumption of reactive energy by means of banks of condensers. On the other hand, the rectifying process is accompanied by current components at harmonic frequencies of the commercial frequency, which must be filtered in order to prevent the invasion of the A.C. network by these frequencies.

Analogous problems are encountered in the conversion of direct current into alternating current, which is performed by means of converters or other devices.

The conversions of high power alternating currents into direct currents and vice versa, are thus affected by a considerable increase in plant investment costs, imposed by the condensers employed to balance reactive energy, and by the filters.

BRIEF DESCRIPTION OF THE INVENTION

The present invention has as its object to embody plants for the conversion of energy which render it possible to secure power regulation while retaining a power factor essentially very cloe to unity at all stages, and in which the cost of filtering devices is reduced considerably at the same time.

According to the invention, a device for conversion of energy apt to operate as a rectifier or as a converter, compirses a transformer having a primary winding connected to an alternating current network, the secondary winding thereof being connected to the terminals of an oscillating circuit comprising controlled rectifiers and producing a pulsating current of very much higher frequency than that of the primary current, a control circuit being connected to the control terminals of the rectifiers in order to block the said oscillating circuit during definite periods, thus allowing for control of the rectified current obtained at the terminals of the said oscillating circuit.

According to another feature, the devices operating in an oscillatory manner referred to above comprises a first lateral branch containing a first inductance connected to one extremity of the secondary winding in series with a thyristor, a second lateral branch containing a second inductance connected to the other extremity of the secondary winding in series with a second thyristor, a branch containing a thyristor in parallel with the combination of a condenser in series with a relatively small inductance, an extremity of the said branch being connected to a median tap of the secondary winding, the other extremity of the branch and a point common to two extremities of the lateral branches being connected to the input terminals of a smoothing circuit, which is apt to deliver a direct current to a load.

According to another feature, the control devices specified above comprise a comparison and blocking element connected by a first series of terminals to the alternating current section, connected by a second series of terminals to the direct current section, connected to a program control system on the other hand, and connected by three output terminals to the control electrodes of the said three thyristors.

According to another feature, an energy conversion in connection with a polyphase circuit is performed by means of several devices of the type defined in the preceding, which are connected, respectively, to the different phases of the alternating current section, and connected to a common load at the direct current side.

In the device according to the invention, the adjustment of the alternating current output to the desired value, intended to obtain the predetermined values of the parameters at the direct current side, is carried out by a method which is equivalent to an amplitude modulation, as will be described hereunder in greater detail, no phase change or shift being engendered between the current and the voltage, the output of the source of alternating current thus occurring essentially with the power factor equal to 1.

On the other hand, the current output occurs in the form of relatively high alternating frequency, amounting to 2,000 c./s. for example, which renders it possible to employ filtering element which are much smaller and less costly than in known rectifiers.

These and other objects, features and advantages of the invention will now be described with reference to the accompanying drawings, which illustrate exemplary embodiments of the invention and wherein:

FIG. 1 diagrammatically illustrates a first embodiment of a plant according to the invention, connected to a single-phase alternating current network;

Figure 1:
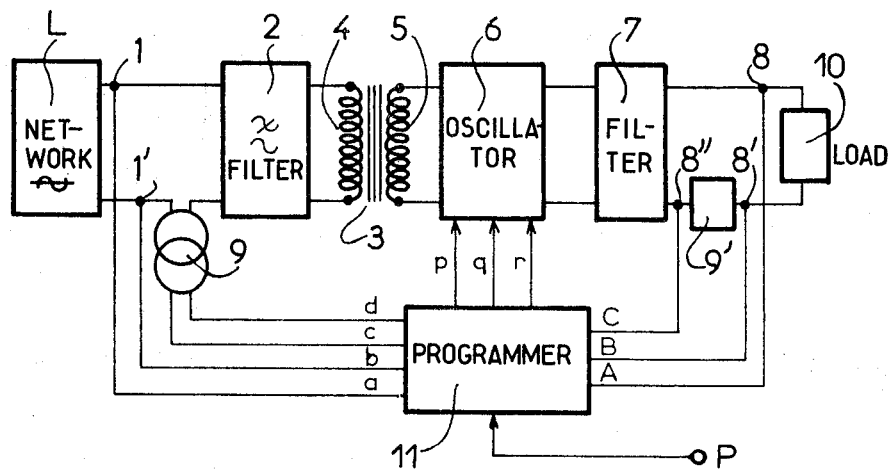
Figure 5:
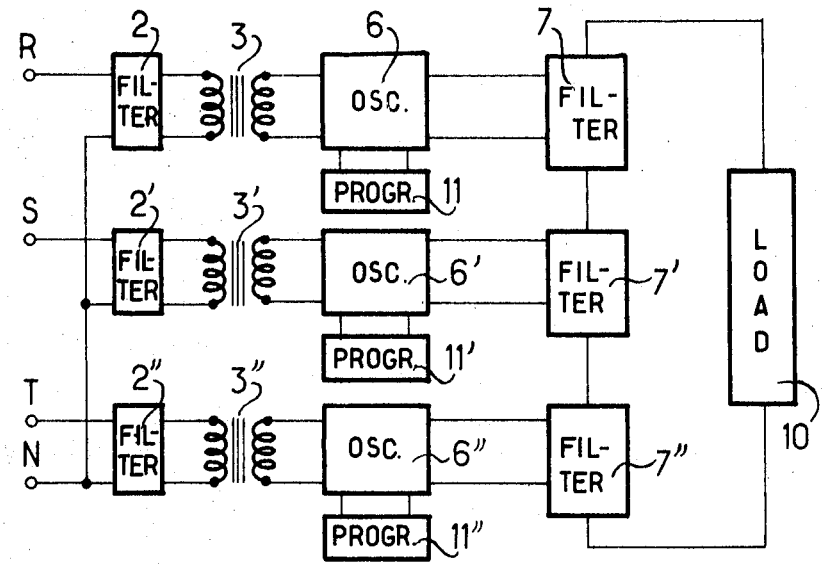
Figure 6:
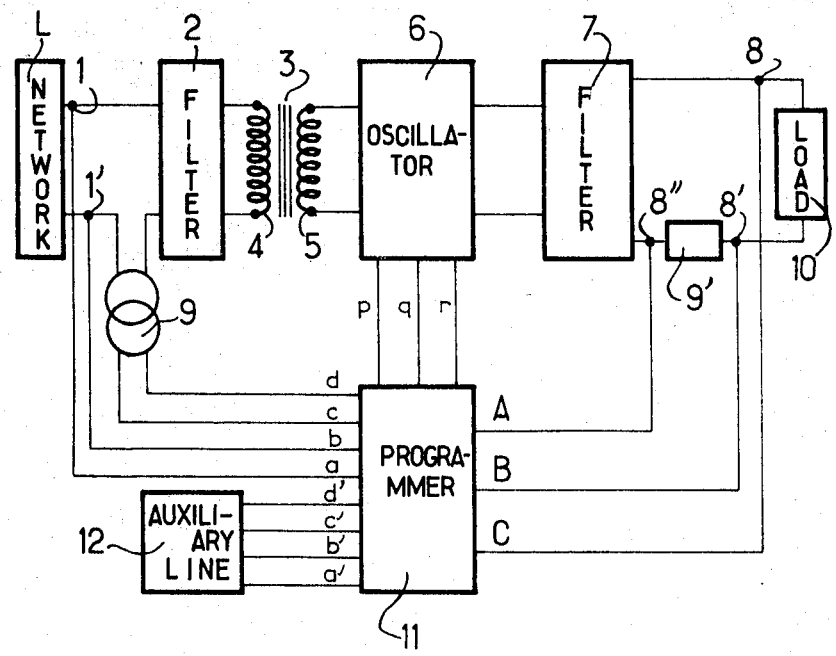
Figure 7:
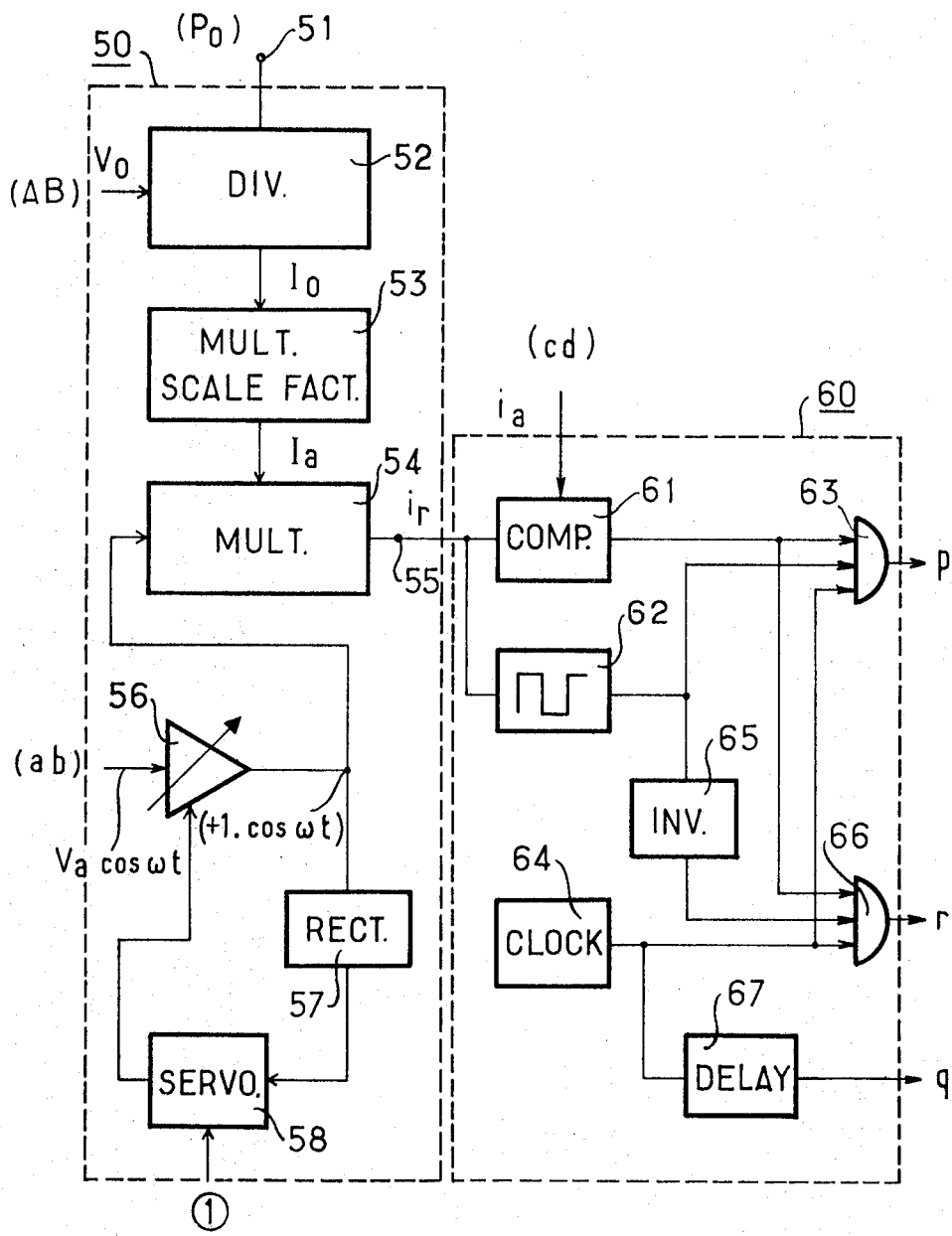
Figure 8:
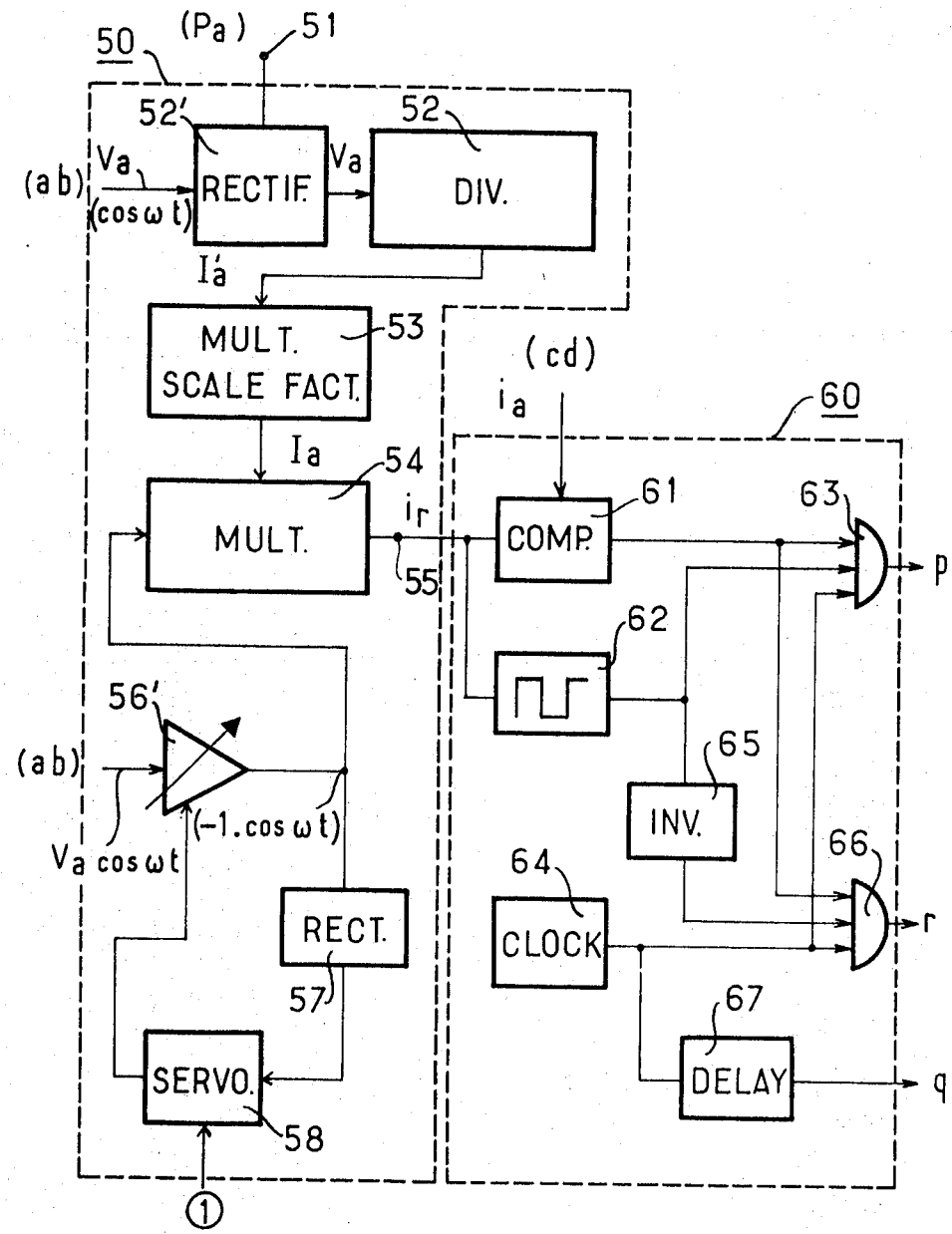

FIG. 5 diagrammatically shows another embodiment of the invention applicable to three-phase operation;

FIG. 6 is a diagram illustrating a mode of operation as a converter of particular type;

FIG. 7 is a block diagram of one form of the programmer forming part of the system of FIG. 1; and FIG. 8 is a block diagram of another form of the programmer forming part of the system of FIG. 1.

DETAILED DESCRIPTION OF THE INVENTION

In FIG. 1, a single-phase alternating current network L supplying current at approximately 50 c./s. is connected to the terminals 1 and 1' of the system consisting of a low-pass filter 2 connected via the primary and secondary windings 4 and 5, respectively, of a transformer 3, to an oscillating and rectifying unit 6, in turn connected to a filter element 7 for filtering or smoothing the rectified current. A direct current load 10, for example, a power transmission line having terminals 8 and 8', is connected to filter element 7. A current transformer 9 is connected in series with the terminal 1' and a shunt 9' is connected between the points 8' and 8" on the direct current side at one output of filter 7. A control element or programmer 11 provided with inputs $a$, $b$, $c$ and $d$, receives data relating to the voltage and the alternating current at the output of network L via current transformer 9, and at A, B and C, being terminals connected to 8, 8' and 8" respectively, receives data relating to the direct voltage and current applied to the load 10.

The input P of the programmer 11 symbolizes the application of a program in any conventional form, in the case of a constant direct voltage value for example, this value will be set up on an appropriate scale by the position of a voltage or potential divider incorporated in the element 11; if the value in question were to be variable chronologically according to a specific rule, the corresponding data may be fed into the plant in the form of a perforated or punched tape unreeling at a specific speed, etc.

Three control wires $p$, $q$ and $r$, connected to the oscillating and rectifying element 6, provide control from the programmer 11. The programming member 11 furnished starting inpulses to the member 6 either over the lines $p$ and $q$ for one alternation of the alternating current, or over the lines $r$ and $q$ for the other alternation of the alternating current. The operation of the programming member 11 will be described in further detail with reference to FIGS. 7 and 8.

The mode of operation of the system of FIG. 1 is the following: Based on the data received at $a$, $b$, $c$ and $d$ for example, voltage $u_a = U_a \cos \omega t$ derived from network L, with $U_a$ equal to a constant nominal value, and alternating current $i_a = I_a \cos \omega t$ derived via current transformer 9, with $I_a$ variable as a function of the direct current load 10, and by calculation based on the data received at A, B and C, as to the current and voltage actually applied to the load 10, and on the program applied at P, the programmer 11 synthesizes an alternating current reference datum wave $i_r = I_r \cos \omega t$ in phase with the alternating voltage $u_a$ and of an amplitude such that the output occurs at a voltage $V_o$ programmed at input P, as seen in FIG. 2.

In accordance with the invention the oscillator 6 is arranged to supply a pulsating current $I_p$ formed by semi-sinusoidal wavetrains, that is to say formed by consecutive alternations of identical polarity, of relatively high frequency such as 2 kc./s. for example, the period of one alternation being 0.25 ms. The oscillator 6 is supplied with commercial frequency current provided by the secondary winding 5 of the transformer 3, and the operation or switching of the oscillator 6 from conduction to non-conduction is controlled by the programmer 11 by means of the connections $p$, $q$ and $r$. The programmer 11 compares the current consumed $I_a \cos \omega t$ indicated by the signal received by the terminals $c$ and $d$ from transformer 9 with the reference current $I_r \cos \omega t$. If the instantaneous value of the current delivered, $i_a$, is lower than the instantaneous value of the reference current $i_r$, the element 11 triggers the operation of the oscillator 6 which emits the pulsating current $I_p$, whereas if the instantaneous value of the current $i_r$ is lower, the element 11 stops the operation of the oscillator 6, which stops the emission of the pulsating current $I_p$. Appropriate tolerances, for example plus or minus 1 to 3%, are evidently arranged to override these decisions on triggering and stopping.

The filter 2 is a low-pass filter which allows the commercial frequency current to pass and prevents the harmonic components of the pulsating current from returning into the supply network L. A filter of this nature is present in known rectifying plants, but in the case of the present invention, the filter only has the task of blocking much higher frequencies; it is thus much more compact and much less costly than those required in known devices.

Figure 2:
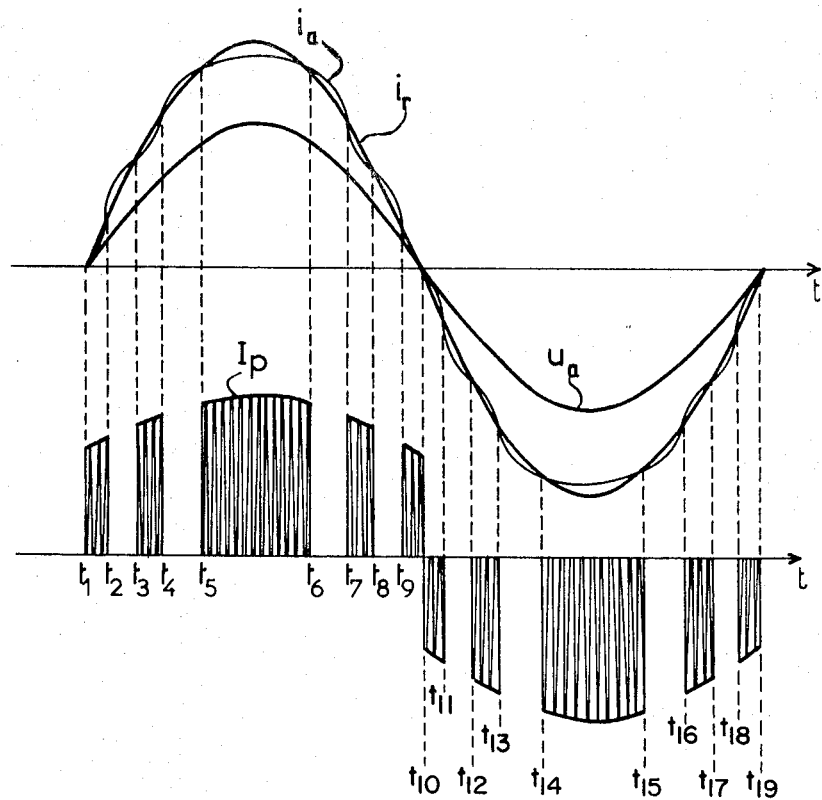
FIG. 2 is a waveform diagram illustrating the principles of operation of the plant according to FIG. 1.

In FIG. 2, one cycle of the alternating voltage $$u_a = U_a \cos \omega t$$

obtained at the terminals 1, 1' of the network L has been plotted as a function of time. The reference or datum current generated by the programmer element 11 is $i_r = I_r \cos \omega t$. The current delivered by the alternating supply network L is represented by the curve $i_a$. The alternating current delivered at the output of the oscillator 6 is illustrated at $I_p$. This pulsating current $I_p$ is allowed to pass only during the interval $t_1$ to $t_2$, $t_3$ to $t_4$, $t_5$ to $t_6$, $t_7$ to $t_8$ and $t_9$ to $t_{10}$, during which the ordinates of the curve $i_a$ are shorter than the ordinates of the curve $i_r$. This process is identical for the negative alternation following the positive alternation which has been described in detail.

In reality, the difference between the curves $i_a$ and $i_r$ will be substantially smaller than the differences shown in FIG. 2, and although a greater number of these will be present as a rule. Five intervals of emission of pulsating current each half cycle have been shown, to simplify the illustration.

Figure 3:
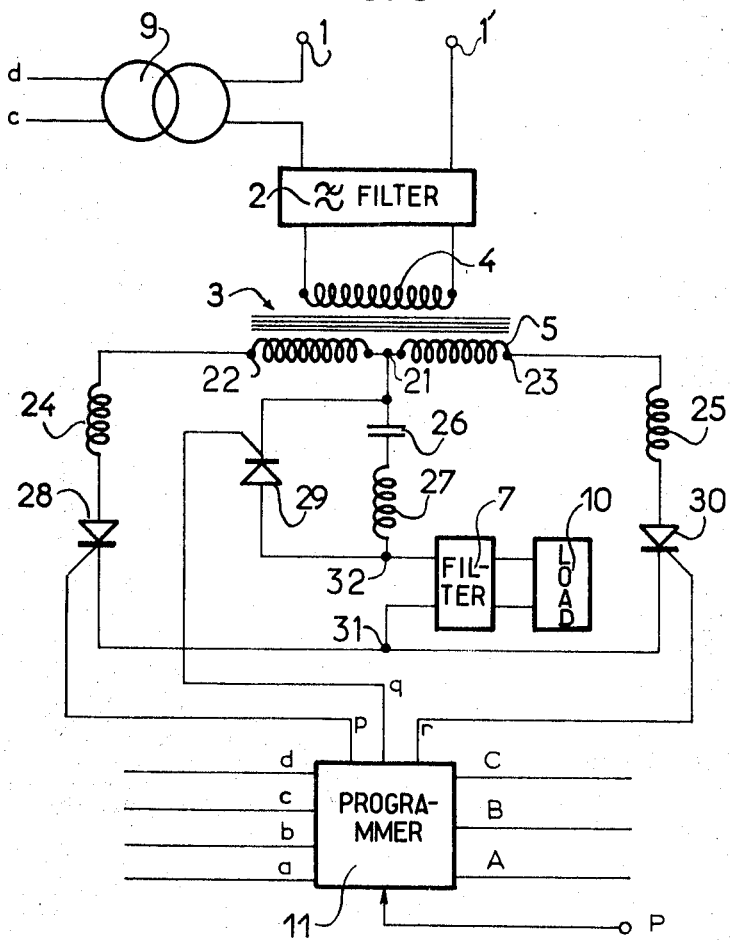
FIG. 3 is a more detailed diagrammatical illustration of one of the elements of the plant according to FIG. 1.

FIG. 3 shows a more detailed illustration of a practical form of the oscillator 6 of FIG. 1, given by way of example, similar elements in the two figures being designated by similar reference numerals therein.

According to FIG. 3, the oscillator 6 is provided with three input terminals: the terminals 22 and 23 are connected to the extremities of the secondary winding 5 of the transformer 3, whereas the terminal 21 is connected to the central point of this secondary winding. The oscillator 6 itself comprises, in series circuit, a first inductance 25, a first thyristor 30, a second thyristor 28 connected in reverse polarity, and a second inductance 24 of equal value to that of the inductance 25, the inductances 24 and 25 possibly being constituted by the leakage inductances of the transformer 3.

The input terminal 21 is connected to a circuit comprising a condenser 26 in series with an inductance 27, of substantially smaller value than the inductances 24 and 25, the elements 26 and 27 being short-circuited by a thyristor 29. The control electrodes of the thyristors 28, 29 and 30 are conencted to the control element 11 by the conductors $p$, $q$ and $r$. The point 31 common to the thyristors 28 and 30, and the point 32 common to the inductances 27 and the thyristor 29, are the input terminals of the filter circuit 7, whose output terminals are connected to the load 10, as provided in FIG. 1.

The programming member 11 operates as follows: It emits starting impulses for the thyristors 28 and 29 by way of the lines $p$ and $q$ during the intervals $t_1$–$t_2$, $t_3$–$t_4$, $t_5$–$t_6$, $t_7$–$t_8$ and $t_9$–$t_{10}$ (FIG. 2). During the other alternation of the alernating current it emits impulses for the thyristors 30 and 29 by way of the lines $r$ and $q$ (FIG. 3) during the intervals $t_{10}$–$t_{11}$, $t_{12}$–$t_{13}$, $t_{14}$–$t_{15}$, $t_{16}$–$t_{17}$ and $t_{18}$–$t_{19}$ (FIG. 2).

During one of these intervals, line $p$ transmits a starting impulse to the thyristor 28 within a period of time, such a $t_a$, and line $q$ transmits a starting impulse to the thyristor 29 within a period of time, such as $t_b$.

Figure 4:
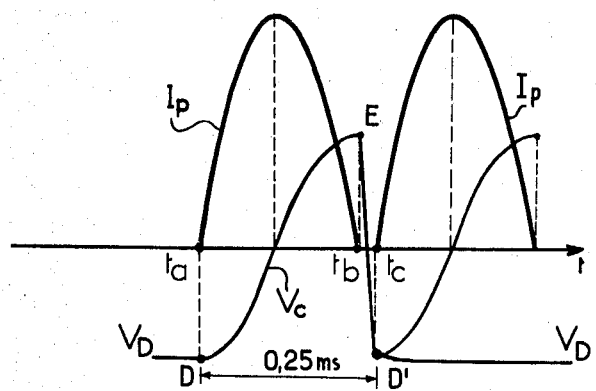
FIG. 4 is a diagram illustrating the operation of the arrangement of FIG. 3.

The circuit of FIG. 3 operates in the following manner:

It is assumed that at the time $t_a$, a triggering pulse $V_p$ is transmitted by the conductor $p$ to the control electrode of the thyristor 28. This results in an onset of oscillation in the resonant circuit including inductance 27, capacitor 26, one part of winding 5, inductance 24, and thyristor 28, at a resonant frequency of the circuit, set approximately at 2 kc./s., for example. This current has the form of a sinusoidal wave $I_p$, illustrated in FIG. 4. As known, this current represents the time derivatives of the voltage $V_c$ at the terminals of the condenser 26. The voltage $V_c$ at the terminals of this condenser 26 thus has the form illustrated by the portion DE of the curve of FIG. 4. The thyristor 28 returns to the blocked state when the current $I_p$ dies out. At this instant, a pulse $V_q$ appiled by the conductor $q$ to the control electorde of the thyristor 29 renders this element conductive. This results in a triggering of resonant current of relatively high frequency, such as 50 kc./s. for example, in the circuit consisting of elements 27, 26 and 29, the inductance 26 being assumed to be much smaller than the inductance 24 or 25. The triggering of the oscillation at relatively high frequency is illustrated by the portion ED′ of the voltage curve of FIG. 4. When at the time $t_c$, the voltage at the terminals of the condenser 26 has regained the value $V_D$ it had at the time $t_a$, the thyristor 29 becomes non-conductive again, and the condenser 26 is ready for renewed emission of current $I_p$. The interval $t_b$–$t_c$ is much shorter than the interval $t_b$–$t_a$, of the order of twenty-five times shorter in the example selected.

During an alternation of the alternating current of the network L, the application of a voltage $V_p$ and of a series of pulses $V_q$ to the oscillator 6 from programmer 11 will thus result in passage of a pulsating current formed by a plurality of pulses $I_p$, $I_p$ . . . During the following half wave of the supply voltage, a pulsating current of the same polarity is obtained thanks to the operation of the second thyristor 30. Interruption of the voltage $V_p$ will cause cessation of the pulsating current, thus providing regulation of the rectified current passed through the load 10.

According to the explanations given above, it is clear that the current supplied by the alternating current network L is systematically constrained to be in phase with the voltage, its amplitude being adjusted by the number of current pulses $I_p$. A supply at power factor substantially equal to 1 is thus always available.

FIG. 5 illustrates an application of the invention in the case of a three-phase network, given by way of example. A star-connected circuit has been chosen as an example, with three phases R, S, T and a neutral point N. Each of the phases is coordinated with a set of elements 2, 3, 6, 11 and 77, insuring generation, rectification and filtering of pulsating currents in the manner described above. The outputs of the filter circuits 2, 2′ and 2″ are connected in series, and the direct current obtained flows in the load or absorber circuit 10.

The device according to the invention, whereof the operation as a rectifier has been described, may equally operate as a positively controlled converter, engendering a supply of alternating current power on being supplied by a direct current generator.

In fact, if a generator or a network supplies alternating power to a consumer, the current traversing a given terminal is in phase with the difference of potential between two terminals of the generator or network. If the same network operates as a receiver of power, the same current is of opposed phase, all other conditions being identical.

A condtion of this nature may very easily be established by means of the device of the invention; it being sufficient for the element 11 to provide a reference current $i_r$ in opposition with the phase of the reference current during operation as a rectifier.

The voltage employed to establish the reference value is provided by the alternating current network during operation as a positively controlled converter. During operation as an uncontrolled or autonomous converter, the latter feeds an absorber circuit or a network connected to other networks; in this case, the reference values are established by a control device which may be an oscillator or an auxiliary circuit. This arrangement is illustrated in FIG. 6, in which similar references have been used to designate similar elements as provided in FIG. 1.

The terminals 1 and 1′ feed alternating power into the line L, whereas an auxiliary line 12 provides power at commercial frequency, possibly at a low energy level, whereof the elements are supplied to the programmer 11 by means of additional connections $a'$, $b'$, $c'$, and $d'$.

FIG. 7 illustrates an embodiment of the programmer which has been identified with reference numeral 11 in the preceding figures. Reference will be had particularly to the system of Fig. 1. The diagram of FIG. 7 relates to the operation of the installation as a rectifier.

The programmer 11 comprises two parts, i.e. a calculator 50 (which in the case of this figure is an analog calculator, although a numerical calculator could possibly be utilized), and a triggering means 60. It is the role of the calculator 50 to supply a reference value, an alternating quantity $i_r$ to the triggering member, which produces control signals $p$, $q$, $r$ to control oscillator 6 to generate "current bursts" $I_p$ (FIG. 2), according to the comparison of this quantity $i_r$ with the actual current value $i_a$.

The calculator 50 is provided with an input terminal 51 by means of which a prescribed value of direct current $P_o$ representing a predetermined desired power level is applied. The dividing member 52 receives from the terminals AB a voltage $V_o$ from the output of filter 7 at terminals 8, 8′. There issues from the divider 52 a direct current $I_o$ ($I_o = P_o/V_o$) corresponding to the maximum desired current from network L, which is transformed in a multiplier 53 into a direct current of value $I_a$. The multiplier 53, which serves for regulating the scale factor, has a fixed regulation, and applies the value $I_a$ to a multiplier 54.

In addition to the continuous value $I_a$, the multiplier 54 draws an alternating current reference value in phase with the alternating voltage taken at the terminals $a$, $b$ in the following manner:

The alternating voltage $V_a \cos \omega t$ from the terminals $a$, $b$ is applied to an amplifier 56 having variable amplification. The output quantity of the amplifier 56, rectified and filtered by the member 57, is applied to a servocontrol member 58 which receives on another terminal a reference voltage equal to a unit value derived, for example, from a battery or Zener diode. From the servocontrol member 58 there is derived the amplification control signal for the amplifier 56. The servo 58 adjusts the amplification of amplifier 56 until $V_a=1$. Thus, at the output of the amplifier 56 a voltage is provided equal to $\cos \omega t$ in phase with the alternating voltage output of network L. This quantity if applied to the second output of the multiplier 54 and there issues therefrom on a terminal 55 a value $i_r = I_r \cos \omega t$ (see FIG. 2).

The triggering means 60 comprises at the input a comparator 61 which receives at the two inputs thus prescribed value $i_r$ and an actual value $i_a$ from terminals $c$, $d$ and a clipper 62 also connected to the output of the multiplier 54. A first AND gate 63 receives on a first input a logical signal from this comparator 61, on a second input an impulse having a logical value of either 1 or 0, originating from the element 62, and on a third input a pulse originating from a clock pulse generator 64. A second AND gate 66 receives on one input the output signal of the comparator 61, on a second input the impulse transmitted through an inverter 65 from the clipper 62, and on a third input the pulses from the clock pulse generator 64. Finally, the clock pulses are also transmitted to a delay member 67.

The operation is as follows:

The comparator receiving on one terminal the instantaneous reference signal $i_r$ compares it with the actual instantaneous value of the alternating current $i_a$, divided from the current transformer 9 (FIG. 1) and applied by the terminals $c$, $d$. For $i_a > i_r$, the comparator furnishes to the gates 63 and 66 a logical signal 0, for $i_a < i_r$, the comparator supplies to the gates 63 and 66 a logical signal 1.

During one half cycle of the current $i_r$, the clipper 62 supplies to the gate 63 an impulse of one valence, for example 1 and the inverter 65 supplies to the gate 66 an impulse of the complementary valence, or 0, whereas in the following cycle of the prescribed current $i_r$, the valences of the impulses received by the gates 63 and 66 are, respectively, reversed.

The clock 64 furnishes pulses, for example at a frequency of 2 kHz. It will be noted that under these conditions the gate 63 supplies the triggering orders 1, for example, for the thyristor 28 (FIG. 3); and the gate 66 supplies the triggering orders $r$ for the thyristor 30.

The clock pulses are applied with an adequate delay to the triggering order or command $q$ of the thyristor 29 to effect the discharge of the condenser 36 after each oscillating current pulse.

FIG. 8 in which the reference symbols have the same meaning as in FIG. 7 corresponds to the operation of the system as an alternator.

The dividing member 52 receives by way of the terminal 51 the prescribed alternating signal $P_a$.

The voltage $V_a \cos \omega t$ divided from the terminals $a$, $b$ passes into a rectifier 52' which applies to the dividing member 52 the direct current voltage $V_a$, corresponding to the crest or peak value of the alternating voltage. There results therefrom a current value $I'$ which is transformed by the multiplier 53 according to the scale factor into the peak value $I_r$.

The operation of the multiplier 54 and of the associated members providing the signal $\cos t$ is identical to that of FIG. 7. The difference in this embodiment consists in that the variable amplification amplifier 56 is replaced therein by an amplifier 56' having variable amplification which furnished reference quantity $-1 \cos \omega t$. In fact, in the operation as an alternator the energy flow is in the inverse direction from the operation as rectifier; that is to say that with respect to the alternating voltage the alternating current is in phase opposition with regard to the preceding case.

The triggering means has exactly the same composition and the same operation as is the case in FIG. 7.

In the case of an autonomous operation where there is no alternating reference voltage available, this reference is provided by a separate element (see the member 12 in FIG. 6) which applies an adequate command to the programming member 50 by means of the terminals $a'$, $b'$.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A device for transforming electrical energy, which device is suitable for operation as a rectifier or as a converter comprising
   a source of alternating current,
   oscillator means connected to said source of alternating current for adjusting the amplitude of the output of said source including a first oscillator circuit generating a pulsating current of higher frequency than said current source and having at least one first voltage controlled rectifier therein, and a second oscillator circuit having a second voltage controlled rectifier therein and a capacitor connected in common with said first oscillator circuit, said capacitor generating a discharge current for said capacitor at a higher frequency than that of said pulsating current generated by said first oscillating circuit, and
   control means connected to said first and second voltage controlled rectifiers and to said source of alternating current for generating control signals in response to deviation of the output current of said source from a given variable maximum, said control signals being applied to actuate said rectifiers during times of detected deviation enabling said first and second oscillating circuits.

2. The combination defined in claim 1 further including a transformer having a primary and a pair of series connected secondary windings interconnecting said source of alternating current and said oscillator means, said first oscillator circuit comprising a first series branch including a first inductance connected to one of said secondary windings and a first voltage controlled rectifier, and a second series branch in parallel with said first series branch including a second inductance connected to the other of said secondary windings and another first voltage controlled rectifier, said second oscillator circuit comprising said second voltage controlled rectifier in parallel with the series combination of said capacitor and a third inductance, a smoothing filter circuit connected to said third inductance, the combination of said second oscillator circuit in series with said smoothing filter circuit being connected from the point of connection of said secondary windings to the point of connection of said first voltage controlled rectifiers.

3. The combination defined in claim 2 wherein said first and second inductances are transformer leakage inductances.

4. The combination defined in claim 3 further including a low-pass filter of relatively high cutoff frequency connected between said source of alternating current and the primary winding of said transformer.

5. The combination defined in claim 4 wherein said control means includes comparison means connected to the output of said source of alternating current and the output of said smoothing filter circuit and means for synthesizing the desired waveform output of said current source, said comparison means comparing said synthesized waveform with said current source output to detect said deviations therebetween.

6. The combination defined in claim 5 wherein said control means further includes a program means for controlling said synthesizing means to produce said synthesized waveform.

7. The combination defined in claim 6 wherein said source of alternating current is a polyphase network having an output for each phase, each of said outputs being connected to a separate oscillator means controlled by a respective control means, the smoothing filter circuits associated with each phase being connected to a common load.

8. A device for transforming electrical energy, which device is suitable for operation as a rectifier or as a converter comprising a source of alternating current, voltage controlled oscillator means connected to said source of alternating current for providing an output signal having a higher frequency than said current source, the envelope of said output signal corresponding to the output waveform of said current source, and control means connected to said current source and said oscillator means for selectively actuating said voltage controlled oscillator means in response to deviation of the output current of said source from a given waveform of maximum amplitude.

9. The combination defined in claim 8 wherein said oscillator means includes voltage controlled rectifier means for controlling the enabling of said oscillator means; said control means being connected to said rectifier means in control thereof.

10. The combination defined in claim 9 wherein said oscillator means further includes capacitor means for controlling the frequency of oscillation thereof and first and second oscillating circuits having said capacitor means in common, said second oscillating circuit generating a discharge current of said capacitor at a very high frequency, said first and second oscillating circuits being operative sequentially.

11. The combination defined in claim 10 wherein said first and second oscillating circuits each include a voltage controlled rectifier forming part of said rectifier means, said rectifiers being connected to said control means for sequentially timed operation during times of said detection deviations.

12. The combination defined in claim 11 further including a transformer having a primary and a secondary winding interconnecting said source of alternating current and said oscillator means, said secondary winding forming part of said first oscillating circuit.

13. The combination defined in claim 12 wherein said control means includes comparison means for comparing the output waveform of said current source with a synthesized waveform to determine said deviations therebetween, and program means for generating said synthesized waveform.

14. The combination defined in claim 13 wherein said source of alternating current is a polyphase network having an output for each phase, each of said outputs being connected through a respective transformer to a respective oscillator means controlled by a respective control means.

References Cited

UNITED STATES PATENTS

| | | | |
|---|---|---|---|
| 3,211,985 | 10/1965 | Torok | 321—47 XR |
| 3,213,351 | 10/1965 | Walker | 321—47 XR |
| 3,214,672 | 10/1965 | Watkins | 321—16 |
| 3,360,711 | 12/1967 | Dinger | 321—44 XR |
| 3,458,796 | 7/1969 | Cassady | 321—47 XR |
| 3,471,768 | 10/1969 | Doyle et al. | 321—47 |

WILLIAM M. SHOOP, Jr., Primary Examiner

U.S. Cl. X.R.

321—18, 47